United States Patent
Koga et al.

(10) Patent No.: US 12,146,069 B2
(45) Date of Patent: Nov. 19, 2024

(54) AQUEOUS SURFACE-TREATING AGENT

(71) Applicants: NOK CORPORATION, Tokyo (JP); NOK KLUBER CO., LTD., Tokyo (JP)

(72) Inventors: Akiko Koga, Kanagawa (JP); Naoki Kameda, Ibaraki (JP); Masaki Tahara, Ibaraki (JP)

(73) Assignees: NOK KLUBER CO., LTD., Tokyo (JP); NOK CORPORATION, Tokyo (JP)

( * ) Notice: Subject to any disclaimer, the term of this patent is extended or adjusted under 35 U.S.C. 154(b) by 449 days.

(21) Appl. No.: 17/773,962

(22) PCT Filed: Oct. 7, 2020

(86) PCT No.: PCT/JP2020/037970
§ 371 (c)(1),
(2) Date: May 3, 2022

(87) PCT Pub. No.: WO2021/090628
PCT Pub. Date: May 14, 2021

(65) Prior Publication Data
US 2022/0389270 A1 Dec. 8, 2022

(30) Foreign Application Priority Data
Nov. 5, 2019 (JP) .................. 2019-200557

(51) Int. Cl.
*C09D 175/04* (2006.01)
*C09D 5/02* (2006.01)
*C09D 5/08* (2006.01)
*C09D 7/65* (2018.01)

(52) U.S. Cl.
CPC ........... *C09D 175/04* (2013.01); *C09D 5/024* (2013.01); *C09D 5/08* (2013.01); *C09D 7/65* (2018.01)

(58) Field of Classification Search
CPC ........ C09D 175/04; C09D 5/024; C09D 5/08; C09D 7/65; C09D 5/02; C09D 7/63; C09D 183/04; C08G 18/44; C08G 18/76; C08G 77/16; C08G 18/837; C08G 2150/90; C08L 83/04; B05D 2201/02; B05D 2202/00
See application file for complete search history.

(56) References Cited

U.S. PATENT DOCUMENTS

| | | | |
|---|---|---|---|
| 5,525,427 A | 6/1996 | Griswold et al. | |
| 5,571,861 A | 11/1996 | Klein et al. | |
| 5,623,016 A | 4/1997 | Klein et al. | |
| 8,658,722 B2 | 2/2014 | Tahara et al. | |
| 8,956,729 B2 | 2/2015 | Fujita et al. | |
| 2007/0036900 A1 | 2/2007 | Liu | |
| 2010/0222475 A1* | 9/2010 | Tahara | C09D 5/00 524/262 |
| 2012/0064354 A1 | 3/2012 | Fujita et al. | |
| 2014/0228261 A1 | 8/2014 | Tahara et al. | |
| 2020/0002818 A1 | 1/2020 | Yamaguchi et al. | |

FOREIGN PATENT DOCUMENTS

| | | |
|---|---|---|
| CN | 101827904 | 9/2010 |
| JP | 7-233347 A | 9/1995 |
| JP | 8-319458 A | 12/1996 |
| JP | 2004-67803 | 3/2004 |
| JP | 2005-125656 A | 5/2005 |
| JP | 2006-124752 A | 5/2006 |
| JP | 2006-299274 A | 11/2006 |
| JP | 2008-63354 A | 3/2008 |
| JP | 2008-267781 A | 11/2008 |
| JP | 2009-504386 A | 2/2009 |
| JP | 2009-137050 A | 6/2009 |
| JP | 2010-177326 A | 8/2010 |
| JP | 2013-67787 A | 4/2013 |
| JP | 2016-204509 A | 12/2016 |
| JP | 2019-94921 A | 6/2019 |
| KR | 10-2010-0066566 | 6/2010 |
| WO | 2009/047938 A1 | 4/2009 |

(Continued)

OTHER PUBLICATIONS

International Search Report issued in International Patent Application No. PCT/JP2020/037970, dated Dec. 15, 2020, along with an English translation thereof.
Written Opinion of the International Searching Authority issued in International Application No. PCT/JP2020/037970, dated Dec. 15, 2020, along with an English translation thereof.

(Continued)

*Primary Examiner* — Pamela H Weiss

(74) *Attorney, Agent, or Firm* — Greenblum & Bernstein, P.L.C.

(57) ABSTRACT

An aqueous surface-treating agent comprising (A) an aqueous emulsion of silicone oil, (B) a silanol-modified polyurethane resin, (C) a silane compound and/or a partial hydrolysate thereof, (D) an aqueous emulsion of a hydrazide and a carbonyl group-containing polyurethane resin, and (E) an aqueous emulsion of a polyurethane resin having a glass transition temperature of −30° C. or lower, and a thermal softening temperature of 70° C. or lower measured by using a flow tester when heated from 40° C. to 150° C. at a heating rate of 5° C./min. The aqueous surface-treating agent contains silicone oil for preventing sticking between products and a silanol-modified polyurethane resin binder having a low hardness and excellent adhesiveness to seal members, and improves the corrosion resistance of an aqueous surface-treating agent for aluminum substrates etc.

5 Claims, No Drawings

(56) References Cited

FOREIGN PATENT DOCUMENTS

WO     2010/131756 A1    11/2010
WO     2018/180986 A1    10/2018

OTHER PUBLICATIONS

International Preliminary Report on Patentability in International Application No. PCT/JP2020/037970, dated May 19, 2022, along with an English translation thereof.

* cited by examiner

AQUEOUS SURFACE-TREATING AGENT

TECHNICAL FIELD

The present invention relates to an aqueous surface-treating agent. More particularly, the present invention relates to an aqueous surface-treating agent that has salt water corrosion resistance and is effectively applied to aluminum substrates etc.

BACKGROUND ART

In order to prevent the corrosion of aluminum housing, surface treatment, such as alumite treatment, anti-corrosion coating treatment, or plating treatment, is generally applied to the aluminum side.

As salt water corrosion resistance coating treatment methods, the following methods have been proposed for example.

Patent Document 1: A heat exchanger aluminum alloy material with excellent corrosion resistance in which a fluororesin paint with an average dry thickness of 1 to 100 μm is directly applied to its surface without providing a coating base film, wherein the ratio of Mg/Al is 0.1 or less, the ratio of the maximum Mg content of the alloy material surface in the depth direction measured by X-ray photoelectron spectroscopy, to the Al content in the depth position where the maximum Mg content is measured.

Patent Document 2: A method for improving the corrosion resistance of a non-stick coating on a substrate, which comprises the following steps:

(a) a step of applying a liquid composition containing a heat-resistant non-fluoropolymer binder and inorganic filler particles having an average particle diameter of about 2 μm or less to a substrate to obtain a base coat with a dry film thickness of about 10 μm;

(b) a step of drying the liquid composition to obtain the base coat; and (c) a step of applying a non-stick coating to the base coat to obtain the coated substrate.

Patent Document 3: A seawater-resistant magnetic material having a coating layer composed of a nitride-based material selected from the group consisting of CrN, TiN, AlN, BN, BCN and AlBN, and a hydrogen-containing DLC or TiC, on the surface of a magnetic substrate coming into contact with seawater, wherein the coating layer is composed of one or more coating layers.

The applicants of this application have previously proposed an aqueous surface-treating agent, which comprises (A) a silicone oil aqueous emulsion, (B) a polyurethane resin aqueous emulsion, and (C) a silane compound represented by the following general formulae:

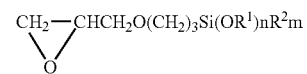
(a)

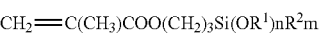
(b)

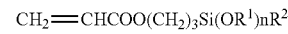
(c)

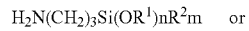
(d)   or

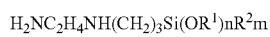
(e)

(where $R^1$ and $R^2$ are each independent alkyl group having 1-4 carbon atoms, n and m each satisfies $1 \leq n \leq 3$ and $m=3-n$) and/or a partial hydrolyzate thereof, wherein 100 parts by weight or more, preferably 100-2,000 parts by weight, of the polyurethane resin in terms of the weight of solid matters is used on the basis of 100 parts by weight in terms of the weight of nonvolatile matters of the silicone oil (Patent Document 4).

Since tight adhesion to substrates can be improved without any bleeding of oily matters by making the total polyurethane resin content higher than the silicone oil content, the aqueous surface-treating agent has the excellent durability. As a result, sticking between rubber materials such as O rings themselves or sticking to metals, resins, etc. can be effectively prevented, and furthermore friction of rubber or resin seal members can be reduced at the time of sliding motion.

However, as shown in the results of Comparative Example 4, described later, the corrosion resistance for aluminum substrates etc. in a salt water corrosion test was insufficient.

PRIOR ART DOCUMENTS

Patent Documents

Patent Document 1 : JP-A-2008-267781
Patent Document 2 : JP-A-2009-504386
Patent Document 3 : JP-A-2010-177326
Patent Document 4 : WO 2009/047938 A1
Patent Document 5 : JP-A-7-233347
Patent Document 6 : JP-A-2006-299274
Patent Document 7 : JP-A-2005-125656

OUTLINE OF THE INVENTION

Problem to be Solved by The Invention

An object of the present invention is to improve the corrosion resistance of an aqueous surface-treating agent for aluminum substrates etc., which contains silicone oil for preventing sticking between products themselves, and a silanol-modified polyurethane resin binder having a low hardness and excellent adhesiveness to seal members.

Means For Solving The Problem

The above object of the present invention can be achieved by an aqueous surface-treating agent comprising (A) an aqueous emulsion of silicone oil, (B) a silanol-modified polyurethane resin, (C) a silane compound and/or a partial hydrolysate thereof, (D) an aqueous emulsion of a hydrazide and a carbonyl group-containing polyurethane resin, and (E) an aqueous emulsion of a polyurethane resin having a glass transition temperature of −30° C. or lower, and a thermal softening temperature of 70° C. or lower measured by using a flow tester when heated from 40° C. to 150° C. at a heating rate of 5° C./min.

Effect of The Invention

In an aqueous surface-treating agent containing silicone oil for preventing sticking between products themselves and a silanol-modified polyurethane resin binder having a low hardness and excellent adhesiveness to seal members, (E) an aqueous emulsion of a polyurethane resin having a glass transition temperature of −30° C. or lower and a thermal softening temperature of 70° C. or lower is added, thereby the corrosion resistance for aluminum substrates etc. (including aluminum die casting substrates) in a salt water corrosion test can be improved.

Since the coating film hardness of the aqueous surface-treating agent is soft, the sealing properties for aluminum substrates etc. are enhanced, and the corrosion prevention function is improved. The corrosion prevention function is achieved in such a manner that a coating film applied to the surface of a seal member follows the surface of a mating material, such as an aluminum substrate, to improve the sealing properties.

Embodiments for Carrying Out The Invention

The aqueous surface-treating agent comprises (A) an aqueous emulsion of silicone oil, (B) a silanol-modified polyurethane resin, (C) a silane compound and/or a partial hydrolysate thereof, (D) an aqueous emulsion of a hydrazide and a carbonyl group-containing polyurethane resin, and (E) an aqueous emulsion of a polyurethane resin having a glass transition temperature of −30° C. or lower, and a thermal softening temperature of 70° C. or lower measured by using a flow tester when heated from 40° C. to 150° C. at a heating rate of 5° C./min, wherein the polyurethane resin having a thermal softening temperature of 70° C. or lower is used in a solid matters weight of 100 parts by weight or more based on 100 parts by weight of the nonvolatile matters weight of the silicone oil.

Further, the solid matters ratio of the raw materials not containing a urethane bond but containing Si to the raw materials containing a urethane bond, that is, solid matters ratio (A+C)/(B+D+E), is 0.5 to 1.0.

As the aqueous surface-treating agent containing a silanol-modified polyurethane resin binder having a low hardness and excellent adhesiveness to seal members and silicone oil for preventing sticking between products themselves, an aqueous dispersion or aqueous solution of the following components (A), (B), (C), (D) and (E) is used.

As the silicone oil being the component (A) used as an aqueous emulsion, an organopolysiloxane having a dynamic viscosity at 25° C. of about 50 to 1,000,000 mm²/sec, preferably about 500 to 200,000 mm²/sec, and having at least one organic group bonded to the silicon atom is used. The molecular structure thereof may be linear, branched, or network; and preferably those having a linear or branched molecular structure, more preferably those having a linear molecular structure, are used. Examples of the organic group bonded to the silicon atom in the organopolysiloxane include alkyl groups, such as methyl, ethyl, propyl, butyl, and hexyl groups; alkenyl groups, such as vinyl and propenyl groups; aryl groups, such as phenyl groups; aralkyl groups, such as phenethyl groups; and those in which some of the hydrogen atoms of these hydrocarbon groups are replaced by halogen atoms, nitrile groups, or the like. Examples of the terminal organic group in the organopolysiloxane include methyl, amino, epoxy, carbinol, hydroxyl, methoxy, methacryloxy, carboxyl, silanol, and alkoxy groups; preferably carbinol, hydroxyl, and methoxy groups. The silicone oil imparts lubricity, low friction resistance, and non-stickiness to surface-treated films.

Further the aqueous emulsion using such a silicone oil includes not only a hydrophilic type silicone oil aqueous emulsion, but also an emulsifier-forced type silicone oil aqueous emulsion, and their dispersion method is not particularly limited. As the silicone oil aqueous emulsion, one having a silicone oil content (nonvolatile matters) of 3-60 wt. % is used.

A predetermined amount of the silanol-modified polyurethane resin aqueous emulsion (B) is added to the silicone oil aqueous emulsion. This silanol-modified polyurethane resin aqueous emulsion is an aqueous dispersion containing a silanol group in the polyurethane structure, and the silanol group is crosslinked by a condensation reaction to form a siloxane bond.

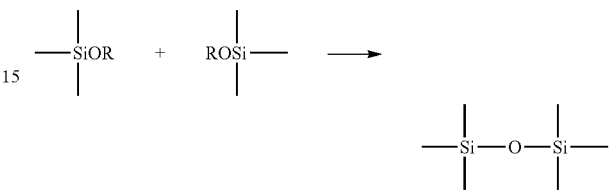

Since the siloxane bond is more stable than bonds formed in other urethanization crosslinking reactions, there is an effect that the resulting surface-treated film has good solvent resistance. The urethane resin aqueous emulsion imparts durability against sliding to the surface-treated film, further incorporates the silicone oil, and imparts lubricity, low friction resistance and non-stickiness to the surface-treated film without bleeding of oil components. As the silanol-modified polyurethane resin aqueous emulsion, one having a resin solid matters concentration of about 10 to 70 wt. % is used.

As the silane compound being the component (C), the compounds represented by the following general formulae are used:

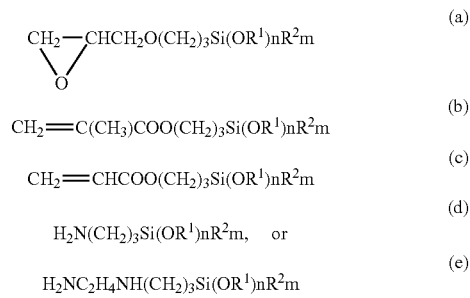

($R^1$, $R^2$ : an alkyl group having 1-4 carbon atoms, n, m : 1 ≤n≤3, m=3−n). These silane compounds are components capable of holding the silicone oil within the surface treated film by reaction with the reactive organic groups of the silicone emulsion and the alkoxy groups of the aforementioned specific silane compounds, and capable of giving a lubricability, a low friction resistance, and a non-stickiness of the surface, without any bleeding the oily matters, and also by reacting with the polyurethane aqueous emulsion to improve the affinity between cross-linked polyurethane resin and the silicone oil to retain the silicone oil within the surface-treated film. Furthermore, these silane compounds has a function to act for a substrate to be surface-treated to improve its coatability.

Such silane compounds include, for example, γ-glycidoxypropyltrimethoxysilane, γ-glycidoxypropyltriethoxysilane, γ-glycidoxypropyltripropoxysilane, γ-glicidoxypropylmethyldimethoxysilane, γ-glycidoxypropylmethyldiethoxysilane, γ-glicidoxypropyl-methyldipropoxysilane, (the above are glycidoxy group-containing silane compounds a); γ-methacryloxypropyl-trimethoxysilane, γ-methacryloxypropyltriethoxysilane, γ-methacryloxy-propyltripropoxysilane, γ-methacryloxy-propylmethyldimethoxysilane, γmethacryloxypropylmethyldiethoxysilane, γ-methacry-loxypropylmethyl-dipropoxysilane (the above are methacry-loxy group-containing silane compound b); 3-acryloxypro-pylmethyldimethoxysilane, 3-acryloxypropylmethyldiethoxysilane, 3-acryloxypropyl-triethoxysilane (the above are acryloxy group-containing silane compounds c) ; 3-aminopropyltrimethoxysilane, 3-aminopropyltriethoxysilane (the above are amino group-containing silane compounds d); and N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-(2-aminoethyl)aminopropylmethyldimethoxysilane (the above are aminoalkyl group-containing silane compounds e), among which γ-glycidoxypropyltrimethoxysilane, γ-glycidoxypro-pylmethyldimethoxysilane, γ-methacryloxypropylt-rimethoxysilane, γ-methacryloxypropylmethyldimethoxysi-lane, etc. are preferably used.

Partial hydrolyzates of these silane compounds can be also used in the present invention. The hydrolyzates can be obtained by condensation reaction of one of the silane compounds or a mixture of two or more thereof, under hydrolysis conditions depending on the types of the selected silane compounds.

It is preferable to add 10-60 parts by weight of the silane compound to 100 parts by weight of oily matters (nonvola-tile matters) of silicone oil emulsion. When the silane compound is used in a proportion of more than 60 parts by weight, the friction coefficient will be increased, and the durability will be lowered, whereas in a proportion of less than 10 parts by weight, excess bleeding of oil will occur.

The aqueous emulsion containing a hydrazide and a carbonyl group-containing polyurethane resin (D) includes an aqueous emulsion of a hydrazide and a carbonyl group-containing polyurethane-vinyl-hybrid polymer, as described in Patent Documents 5 and 6. This is cross-linked by the azomethine bonds formed by the reaction between the hydrazide and the carbonyl group of polyurethane-vinyl-hybrid polymer. In this case, these two compounds are used generally in a proportion of the number of hydrazine groups to the number of carbonyl groups of 1:40 to 2:1.

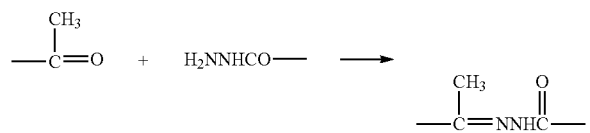

The hydrazide includes hydrazine, lower molecular weight aliphatic compound, aromatic compound or mixture thereof having a hydrazide group and/or a hydrazone group, and a polyhydrazide or a polyvalent hydrazide compound having at least two of these groups are also used. The polyurethane-vinyl-hybrid polymer is prepared by free radi-cal-initiated polymerization of an ionically and/or nonioni-cally stabilized polyurethane macromonomer having a ter-minal vinyl group and/or side chain vinyl group, and in some cases a terminal hydroxyl group, a urethane group, a thiou-rethane group or a urea group, with other functional vinyl monomer having a carbonyl group, and a non-functional vinyl monomer. For such aqueous emulsion, commercially available products, such as Daotan VTW6462/36WA, a product of Japan Thytec Industries, or Daotan series, prod-ucts of Solucia Japan, etc. can be practically used, as described in Patent Document 7.

The aqueous emulsion containing a hydrazide and a carbonyl group-containing polyurethane resin being the component (D) is mixed so that the solid matters weight ratio of the silanol-modified polyurethane resin (B) to the total solid matters amount of the hydrazide and carbonyl-modified polyurethane resin aqueous emulsion (D) is from 95-5 to 10-90. In the case of using a polyurethane resin aqueous emulsion that does not have a self-crosslinkable group, it is used at the same solid matters weight ratio.

The cross-linkable type polyurethane has more distin-guished solvent resistance, tight adhesion, and stability than those having no self cross-linkable group, and thus even in the case of only using the aqueous emulsion of a hydrazide and a carbonyl group-containing polyurethane resin, the afore-mentioned characteristics can be fully obtained by making the total content of polyurethane higher than the content of silicone oil. The silanol-modified, self cross-linkable type polyurethane can attain much higher levels of solvent resistance and tight adhesion. Thus, the surface-treating agent using the polyurethane resin aqueous emul-sion in which a mixture of these components is used can reduce the friction of rubber or resin seal members at the time of sliding motion, and also can improve the solvent resistance. The silanol groups contained therein have a good compatibility with silicone oil and silane compounds being constituents of the aqueous surface-treating agent. This is another advantage of using the aqueous emulsion containing the silanol-modified polyurethane resin.

As the polyurethane resin that forms the component (E), one having a glass transition temperature of −30° C. or lower is used so as to ensure flexibility at the low temperature. Further, a polyurethane resin having a thermal softening temperature of 70° C. or lower, which is softened at the time of use and can further improve sealing properties, is added as an aqueous emulsion. Examples the aqueous emulsion of such a polyurethane resin include components described below. Here, the thermal softening temperature is a tem-perature at which the start of softening is observed when the temperature of the rein is raised from 40° C. to 150° C. at a heating rate of 5° C./min by using a flow tester.

Examples of the component (E) include aromatic isocya-nate ester-based polyurethane resin aqueous emulsions, aro-matic isocyanate ether-based polyurethane resin aqueous emulsions, non-yellowing isocyanate carbonate-based poly-urethane resin aqueous emulsions, non-yellowing isocya-nate ether-based polyurethane resin aqueous emulsions, non-yellowing isocyanate ester-based polyurethane resin aqueous emulsions, non-yellowing isocyanate ester/ether-based polyurethane resin aqueous emulsions, and the like. The thermal softening temperature of these emulsions varies depending on the molecular weight, branching or crosslink-ing density, and the like.

Here, when an aqueous emulsion of a polyurethane resin having a thermal softening temperature exceeding 70° C. (e.g., Superflex 650, produced by DKS Co. Ltd.) is used, the corrosion resistance for aluminum substrates etc. in the salt water corrosion test cannot be improved.

The polyurethane resins (solid matters) being the com-ponents (B), (D) and (E) are compounded so that the total amount of these components is about 100 parts by weight or more, preferably about 100 to 2,000 parts by weight, based on 100 parts by weight of the silicone oil amount (nonvolatile matters) of the silicone oil aqueous emulsion. If the modified polyurethane resin is used at a ratio less than this range, the coatability is deteriorated, and bleeding of the silicone oil occurs, causing durability deteriorated, which is not preferable.

Further, the ratio between each component, that is, the solid matters ratio (A+C)/(B+D+E), i.e. the solid matters ratio (raw materials not containing a urethane bond but containing Si/raw materials containing a urethane bond), must be 0.5 to 1.0, preferably 0.5 to 0.7. If the solid matters ratio exceeds 1.0, the corrosion resistance for aluminum substrates etc. in the salt water corrosion test cannot be improved.

Moreover, it is preferable that the solid matters ratio (E)/(B) of the component (E) to the silanol-modified polyurethane resin aqueous emulsion being the component (B) is 0.5 or more, preferably 0.7 or more. If the solid matters ratio is less than 0.5, the corrosion resistance for aluminum substrates etc. in the salt water corrosion test may not be improved.

To prevent repelling or partial liquid gathering, thereby stopping occurrence of a potted coating or short of coating amount, an amphoteric surfactant such as alkylamine oxide-based compounds, alkyl betaine, etc. can be also compounded in the surface-treating agent consisting of the above-mentioned essential components. The alkylamine oxide-based compounds include dimethylalkylamine oxide, etc., and the alkyl betaine includes alkyldimethylaminoacetic acid betaine, etc., where the alkyl group includes lauryl group, myristyl group, natural oil (for example, coconut oil, etc.)-modified groups, and the like. The alkylamine oxide-based compound or the alkyl betaine can be used in a proportion of 10 wt. % or less on the basis of total composition. These are used as the component (G).

Examples of the polyurethane resin aqueous emulsion include a self-emulsification type in which a hydrophilic group is introduced into the polyurethane structure, a forced emulsification type emulsified using an emulsifier, and the like. These emulsions can be used without any restriction concerning the structure of polyurethane molecule, such as an ether polyol type, an ester polyol type, or a polycarbonate type.

A defoaming agent, a pigment, inorganic powders, a thickening agent, a surfactant, etc. can be further compounded in the surface-treating agent, if required. The composition is used after being prepared by dilution with water to the concentration of the effective components to 0.1 to 40 wt. % from the viewpoint of coating efficiency and coatability. These compounding ingredients are used after being mixed and emulsification-treated while sufficiently stirred. The mixing can be carried out by a well-known mixer-stirrer, a combi-mix, etc. equipped with stirring blades of paddle type, anchor type, etc., and the emulsification treatment can be carried out by using an emulsifying-dispersing device such as a colloid mill, a homo-mixer, a homogenizer, a combi-mix, a sand grinder, etc.

The surface-treating agent so prepared can be subjected to surface treatment by applying it to the surface of a member to be coated by a method such as immersion, brush coating, roll coating, spray coating, knife coating, dip coating, etc., followed by heat drying at 120° to 150° C. for 30 to 60 minutes to form a cured film.

The present surface-treating agent can be effectively used for rubber materials such as fluororubber, NBR, hydrogenated NBR, SBR, isoprene rubber, butadiene rubber, chloroprene rubber, acrylic rubber, EPDM, urethane rubber, silicone rubber, etc., or for resin materials such as thermoplastic resins such as ABS and AS, thermosetting resins, etc. The main object of the present invention is to improve the corrosion resistance for aluminum substrates etc. in the salt water corrosion test.

Specifically, the present surface-treating agent can be effectively used, for example, for aluminum substrates of converters for fuel cell (FC) vehicles, electric power steering/computer (EPS/ECU) for hybrid electric vehicles (HEV), thermo-housings, continuously variable transmissions (CVT) for HEV, electric water pumps (W/P), stroke sensors, V pumps, EPS, brakes, and the like.

EXAMPLES

The following describes the present invention with reference to Examples.

Example 1

| | | |
|---|---|---|
| (A) | Both terminal hydroxyl groups-containing emulsion-polymerized polydimethylsiloxane aqueous emulsion (viscosity at 25° C.: 100,000 mPa · s; nonvolatile matters: 33%) | 54.5(18.0) parts by weight |
| (B) | Silanol-modified polyurethane resin aqueous emulsion (solid matters: 30 wt. %; Tackelack WS-5000, produced by Mitsui Chemical Polyurethane Co.) | 50.0(15.0) parts by weight |
| (C) | γ-glycidoxypropyltrimethoxysilane | 9.1 parts by weight |
| (D) | Hydrazide and carbonyl group-containing polyurethane resin aqueous emalsion (solid matters: 36 wt. %; Daotan VTW 6462/36WA) | 36.4(13.1) parts by weight |
| (E) | Aromatic isocyanate ester-based polyurethane resin aqueous emulsion (solid matters: 40 wt. %, glass transition temperature: −34° C., thermal softening temperature: 45° C.; Superflex 740, produced by DKS Co. Ltd.) | 25.0 (10.0) parts by weight |
| (F) | Dimethyllaurylamine oxide (amphoteric surfactant) | 0.35 parts by weight |
| (G) | Water | 477.5 parts by weight |

Each of the above components (the number in parentheses indicates solid matters weight) was mixed, and the mixture was further emulsified using a homogenizer and an ultrasonic treatment device to obtain a surface-treating agent.

Then, using a sheet and an O ring, both of which were degreased with methyl ethyl ketone, the surface-treating agent was applied to the EPDM sheet and EPDM O ring (hardness: JIS A 70 degrees, size (inner diameter): 7.8 mm, thickness (diameter): 1.9 mm bearing number: JIS B 2401-4 type D P8) by a spray coating method, and then cured at 150° C. for 30 minutes, thereby producing a double-side coated EPDM sheet and EPDM O ring each having a coating film with a film thickness of about 10 μm.

Using the surface-treated double-side coated EPDM sheet or EPDM O ring with a thickness of 10 mm, the following items were measured and tested.

Friction coefficient: According to ASTM D-1894, the dynamic friction coefficient of the surface-treated EPDM rubber sheet surface was measured by a surface tester (TYPE 14DR, produced by HEIDON).

(Test conditions) Mating material: a SUS304 chrome-plated steel ball having a diameter of 10 mm Moving speed: 50 mm/min Load: 0.49 N Amplitude: 50 mm Sticking test: A coating was applied to both surfaces of the EPDM sheet (width: 5 mm), and the coated surfaces were held by a SUS301 plate with a thickness of 2 mm. The resultant was heated at 100° C. for 30 minutes and then cooled to room temperature. By using a load measuring device (LTS-200N, produced by Minebea Inc.), the SUS plate to which the sheet stuck was fixed, and the sheet was pulled in the vertical direction at 90° at a speed of 50 mm/min. Then, the sticking force at that time was measured.

Salt water corrosion test: The coated EPDM O ring was held by an aluminum substrate (ADC12) with a roughness Rz of 6 μm at a compression ratio of 17%, and dipped in 5 wt. % saline at 50° C. for 2000 hours. Then, the aluminum substrate and the O ring were released, and the presence or absence of rust on the sealing surface was evaluated.

⊚: The sealing surface was not corroded.

○: Although the sealing surface was corroded, the corrosion did not exceed the seal line.

X: The corrosion exceeded the seal line.

Example 2

In Example 1, the amount (solid matters weight) of the silanol-modified polyurethane resin aqueous emulsion being the component (B) was changed to 10 parts by weight.

Example 3

In Example 1, the amount (solid matters weight) of the silanol-modified polyurethane resin aqueous emulsion being the component (B) was changed to 20 parts by weight and the amount (solid matters weight) of the aromatic isocyanate ester-based polyurethane resin aqueous emulsion being the component (E) was changed to 20 parts by weight, respectively.

Example 4

In Example 1, the amount (solid matters weight) of the silanol-modified polyurethane resin aqueous emulsion being the component (B) was changed to 10 parts by weight, and the amount (solid matters weight) of the aromatic isocyanate ester-based polyurethane resin aqueous emulsion being the component (E) was changed to 5 parts by weight, respectively.

Example 5

In Example 1, the amount (solid matters weight) of the silanol-modified polyurethane resin aqueous emulsion being the component (B) was changed to 5 parts by weight, and the amount (solid matters weight) of the aromatic isocyanate ester-based polyurethane resin aqueous emulsion being the component (E) was changed to 20 parts by weight, respectively.

Example 6

In Example 1, 22.0 (solid matters weight: 9.9) parts by weight of a non-yellowing isocyanate carbonate-based polyurethane resin aqueous emulsion (solid matters: 45 wt. %, glass transition temperature: −39° C., thermal softening temperature: 62° C.; Superflex 500M, produced by DKS Co. Ltd.) was used as the component (F) in place of the aromatic isocyanate ester-based polyurethane resin aqueous emulsion being (E).

Comparative Example 1

In Example 3, 5 parts by weight (as solid matters) of an aromatic isocyanate ester-based polyurethane resin aqueous emulsion being the component (E) was used.

Comparative Example 2

In Example 5, the component (A), the component (C) and the component (D) were not used, and 10 parts by weight (as solid matters) of an aromatic isocyanate ester-based polyurethane resin aqueous emulsion being the component (E) was used.

Comparative Example 3

In Example 5, 5 parts by weight (as solid matters) of an aromatic isocyanate ester-based polyurethane resin aqueous emulsion being the component (E) was used.

Comparative Example 4

In Example 4, the aromatic isocyanate ester-based polyurethane resin aqueous emulsion being the component (E) was not used.

Comparative Example 5

In Example 1, the silanol-modified polyurethane resin aqueous emulsion being the component (B) was not used.

Comparative Example 6

In Example 1, the amount (solid matters weight) of the silanol-modified polyurethane resin aqueous emulsion being the component (B) was changed to 30 parts by weight, and the amount (solid matters weight) of the aromatic isocyanate ester-based polyurethane resin aqueous emulsion being the component (E) was changed to 30 parts by weight, respectively.

Comparative Example 7

In Example 1, the amount (solid matters weight) of the silanol-modified polyurethane resin aqueous emulsion being the component (B) was changed to 40 parts by weight, and the amount (solid matters weight) of the aromatic isocyanate ester-based polyurethane resin aqueous emulsion being the component (E) was changed to 40 parts by weight, respectively.

Comparative Example 8

In Example 1, the amount (solid matters weight) of the silanol-modified polyurethane resin aqueous emulsion being the component (B) was changed to 70 parts by weight, and the amount (solid matters weight) of the aromatic isocyanate ester-based polyurethane resin aqueous emulsion being the component (E) was changed to 70 parts by weight, respectively.

Comparative Example 9

In Example 1, the amount (solid matters weight) of the silanol-modified polyurethane resin aqueous emulsion being the component (B) was changed to 100 parts by weight, and the amount (solid matters weight) of the aromatic isocyanate ester-based polyurethane resin aqueous emulsion being the component (E) was changed to 100 parts by weight, respectively.

Comparative Example 10

An uncoated EPDM sheet was measured and evaluated.

Tables 1 and 2 below show the amount of the component (B), the amount of the component (E), and the amount of water used in each of the above Examples and Comparative Examples, the ratio (A+C)/(B+D+E), the ratio (E)/(B), and the results of the various tests.

TABLE 1

|  | Example | | | | | |
| --- | --- | --- | --- | --- | --- | --- |
|  | 1 | 2 | 3 | 4 | 5 | 6 |
| [component; parts by weight] | | | | | | |
| Component (B) | 15 | 10 | 20 | 10 | 5 | 15 |
| Component (E) | 10 | 10 | 20 | 5 | 20 | — |
| Component (F) | — | — | — | — | — | 9.9 |
| Amount of water | 477.5 | 443.1 | 584.7 | 405.4 | 484.8 | 478.2 |
| (A + C)/(B + D + E) | 0.7 | 0.8 | 0.5 | 1.0 | 0.7 | 0.7 |
| (E)/(B) | 0.7 | 1.0 | 1.0 | 0.5 | 4.0 | 0.7 |
| [Measurement and results of evaluation] | | | | | | |
| Dynamic friction coefficient | 0.18 | 0.17 | 0.54 | 0.15 | 0.25 | 0.19 |
| 100° C. Sticking (N/mm) | 0 | 0 | 0 | 0 | 0 | 0 |
| Salt water dipping | ◉ | ○ | ◉ | ○ | ○ | ○ |

The above results of each Comparative Example reveal the followings.

(1) When the solid matters ratio (A+C)/(B+D+E) is outside the range of 0.5 to 1.0, the salt water corrosion resistance for aluminum substrates etc. cannot be improved (Comparative Examples 2 to 5).

(2) Even when the solid matters ratio (A+C)/(B+D+E) is within the range of 0.5 to 1.0, if the solid matters ratio (E)/(B) is less than 0.5, the salt water corrosion resistance for aluminum substrates etc. cannot be improved (Comparative Example 1).

(3) When the solid matters ratio (E)/(B) is 0.5 or more, and the solid matters ratio (A+C)/(B+D+E) is less than 0.5, the salt water corrosion resistance for aluminum substrates etc. is excellent; however, increase of dynamic friction coefficient and/or 100° C. stickiness is recognized (Comparative Examples 6 to 9).

The invention claimed is:

1. An aqueous surface-treating agent comprising (A) an aqueous emulsion of silicone oil, (B) a silanol-modified polyurethane resin, (C) a silane compound and/or a partial hydrolysate thereof, (D) an aqueous emulsion of a hydrazide and a carbonyl group-containing polyurethane resin, and (E) an aqueous emulsion of a polyurethane resin having a glass transition temperature of −30° C. or lower, and a thermal softening temperature of 70° C. or lower measured by using a flow tester when heated from 40° C. to 150° C. at a heating rate of 5° C./min.

2. The aqueous surface-treating agent according to claim 1, wherein the polyurethane resins as (B), (D) and (E) components are used in a solid matters weight of 100 parts by weight or more based on 100 parts by weight of the nonvolatile matters weight of the silicone oil.

3. The aqueous surface-treating agent according to claim 1, wherein the solid matters ratio of the raw materials not containing a urethane bond but containing Si to the raw materials containing a urethane bond, that is, solid matters ratio (A+C)/(B+D+E), is 0.5 to 1.0.

4. The aqueous surface-treating agent according to claim 3, wherein the solid matters ratio (E)/(B) is 0.5 or more.

TABLE 2

|  | Comperative Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| [component; parts by weight] | | | | | | | | | | |
| Component (B) | 20 | 5 | 5 | 10 | — | 30 | 40 | 70 | 100 | — |
| Component (E) | 5 | 10 | 5 | — | 10 | 30 | 40 | 70 | 100 | — |
| Amount of water | 472 | 107.9 | 372.7 | 367.8 | 377 | 726.5 | 868.2 | 1293.2 | 1718.3 | — |
| (A + C)/(B + D + E) | 0.7 | 0.0 | 1.2 | 1.2 | 1.2 | 0.4 | 0.3 | 0.2 | 0.1 | — |
| (E)/(B) | 0.3 | 2.0 | 1.0 | 0.0 | — | 1.0 | 1.0 | 1.0 | 1.0 | — |
| [Measurement and results of evaluation] | | | | | | | | | | |
| Dynamic friction coefficient | 0.34 | 3.36 | 0.15 | 0.13 | 0.163 | 1.24 | 1.65 | 2.57 | 2.72 | 1.45 |
| 100° C. Sticking (N/mm) | 0 | 0.14 | 0 | 0 | 0 | 0 | 0.07 | 0.12 | 0.07 | 0.05 |
| Salt water dipping | X | X | X | X | X | ◉ | ◉ | ○ | ◉ | X |

Notes)
In Comparative Example 2, neither of the components (A), (C) and (D) were used.

5. The aqueous surface-treating agent according to claim 1, wherein the polyurethane resin having a thermal softening temperature of 70° C. or lower is an aromatic isocyanate ester-based polyurethane resin or a non-yellowing isocyanate carbonate-based polyurethane resin.

* * * * *